(No Model.)

B. HOGAN.

BELT FASTENER.

No. 264,290. Patented Sept. 12, 1882.

Attest,
Geo. T. Smallwood Jr
Jno. L. Condron

Inventor:
Benjamin Hogan
By Knight Bros
attys

UNITED STATES PATENT OFFICE.

BENJAMIN HOGAN, OF SAGINAW, MICHIGAN.

BELT-FASTENER.

SPECIFICATION forming part of Letters Patent No. 264,290, dated September 12, 1882.

Application filed June 3, 1882. (No model.)

*To all whom it may concern:*

Be it known that I, BENJAMIN HOGAN, a citizen of the United States, residing at Saginaw, in the county of Saginaw and State of Michigan, have invented certain new and useful Improvements in Belt-Fasteners, of which the following specification is a full, clear, and exact description, reference being had to the accompanying drawings, forming part of this specification, in which—

Figure 1:
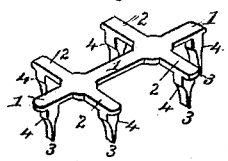
Figure 2:
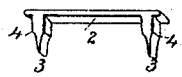
Figure 3:
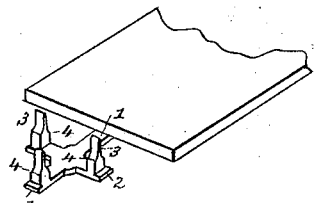
Figure 4:
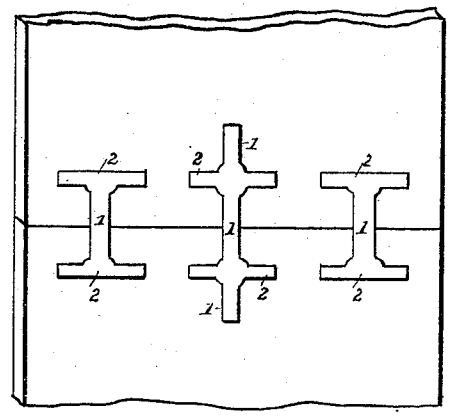

Figure 1 is a perspective view. Fig. 2 is a perspective view of the central bar thereof. Fig. 3 illustrates two sections of belt joined together with my improved fastener. Fig. 4 is a section of belt with one-half of the fastener attached.

In Letters Patent granted to me the 6th of June, 1882, a belt-fastener with two points connected by a straight bar is shown. The present invention is an improvement on the same, the object in view being to greatly increase the holding-power of the fastener, while leaving it its full flexibility.

To this end the invention consists in forming the fastener with a longitudinal and with transverse bars, each of said bars being formed with pointed downturned ends, for the purpose of attachment to the belt ends, and said points having each two shoulders at such part of their length that when the fastener is attached to a belt the shouldered portion will have just penetrated or nearly penetrated through the belt, so that the thin flexible part of the point below the shoulder may be readily bent and clinched.

In the drawings, 1 represents the longitudinal, and 2 2 the transverse bars, of my improved fastener. The transverse bars may be at the ends of the longitudinal bar or at any intermediate parts of its length, and the size of the fastener may be varied proportionately to the thickness of the belting and the strength required, the number of fasteners employed depending on the width of the belt to which they are applied. Fasteners of different lengths may be used on the same belt, in which case they may be arranged, as shown in Fig. 3, with fasteners, with and without the longitudinal bar projecting beyond the transverse bars alternating one with the other. Each end of the bars 1 2 2 is turned down, as shown in Figs. 1, 2, and 4, such downturned portions 3 3 being made sufficiently sharp at their ends to enable the fastener to be fastened to the belt with slight pressure. The bars 1 2 2 may project beyond the parts 3 3, to hinder the fastener from penetrating too far. Two shoulders, 4, are formed on the parts 3 3 at such a distance from the bar 1 (or 2) as that when the said parts 3 3 are pressed into the belt to the proper depth the shoulders 4 4 will have completely or nearly passed through the same. Beyond the shoulders 4 the ends 3 3 are made thin, so as to be easily bent and clinched on the belt without bending the thicker part of the points on which the strain of the joint will bear. By reason of their straight bearing and thickness the downturned ends are thus provided with a much stronger hold on the belt, and form a stronger joint than do those fasteners in which blunt ends are employed or in which the ends are tapered gradually to a point.

Two or more rows of these fasteners, alternately longer and shorter, may be simply and easily applied, and greater strength obtained thereby, whereas where hooks with curved ends or points are employed more than one length cannot be used with facility.

These fasteners may be readily punched from a sheet of metal, and pointed and bent into shape, as shown and represented, with dies and stamps suitably constructed for that purpose, but not forming part of this invention. They may also be made of malleable cast metal, but preferably of wrought metal, it being more flexible.

I am aware that solid plate-fasteners having a series of points have been employed in connecting the ends of belts; but such fastening-plates make the parts connected rigid and unpliable, and are not adapted to the various purposes for which belts are employed. By the method of forming the fastenings herein described the joints will prove flexible and not liable to injury by the fastening cutting into the fabric of the belting.

Having thus described my invention, the following is what is therein claimed as new:

The belt-fastener having longitudinal bar 1, transverse bars 2 2, and the downturned ends 3 3, each of which is provided with two shoulders, 4 4, all substantially as shown, and for the purpose set forth.

BENJAMIN HOGAN.

Witnesses:
 CHAS. E. HAUG,
 JOHN P. SCHWAHN.